United States Patent
Arcidiacono

[15] 3,649,132
[45] Mar. 14, 1972

[54] VIBRATION CONTROL FOR ROTORS

[72] Inventor: Peter J. Arcidiacono, East Hampton, Conn.

[73] Assignee: United Aircraft Corporation, East Hartford, Conn.

[22] Filed: Mar. 2, 1970

[21] Appl. No.: 15,407

[52] U.S. Cl. .................................416/18, 416/145, 416/500
[51] Int. Cl. .........................................................B64c 27/72
[58] Field of Search.......................416/1, 18, 144, 145, 500; 244/17.11; 916/31

[56] References Cited

UNITED STATES PATENTS

| | | | |
|---|---|---|---|
| 3,108,641 | 10/1963 | Taylor | 416/18 |
| 2,519,762 | 8/1950 | Hoffmann et al. | 416/18 |
| 2,892,502 | 6/1959 | Donovan | 416/500 X |
| 3,298,443 | 1/1967 | Burkham et al. | 416/145 X |
| 3,372,758 | 3/1968 | Jenney | 416/500 X |
| 3,477,665 | 11/1969 | Legrand | 416/500 X |
| 3,509,971 | 5/1970 | Gerstine et al. | 416/500 UX |

FOREIGN PATENTS OR APPLICATIONS

| | | | |
|---|---|---|---|
| 1,226,593 | 2/1960 | France | 416/18 |
| 908,443 | 10/1962 | Great Britain | 416/500 |

*Primary Examiner*—Everette A. Powell, Jr.
*Attorney*—Maurice B. Tasker and Donald F. Bradley

[57] ABSTRACT

A helicopter rotor has weights, one for each blade, mounted on arms which are pivoted remote from the axis of rotation of the rotor. The weights are connected through adjustable linkage mechanism with their respective blade horns in such manner that the system including all moving parts involved in the blade pitch motion can be turned to a desired frequency which is equal to the basic frequency of the blade vibration due to forward flight of the helicopter. When the tuned system is excited by aerodynamic vibratory forces at the tuned frequency, a pitch vibration of the blade results which leads to the generation of additional aerodynamic forces tending to cancel the original vibrational forces.

4 Claims, 2 Drawing Figures

INVENTOR
PETER J. ARCIDIACONO
BY M.B. Jasker
ATTORNEY

VIBRATION CONTROL FOR ROTORS

BACKGROUND OF THE INVENTION

One problem associated with rotary wing aircraft is the undesirable vibratory forces generated when the rotor is operating in forward flight. In addition to causing discomfort to the aircraft's occupants, such forces contribute directly to the deterioration of parts and increased maintenance costs.

Pivoted arms carrying weights at their free ends have heretofore been provided on the rotating parts of a helicopter rotor for the purpose of preventing feed back of unbalanced forces in the blades which result in undesirable movements of the pilot's control stick. Pivoted weight-carrying arms have also been used together with linkage connecting the arms with their respective blade horns for the purpose of stabilizing the helicopter in flight by automatically damping pitch and roll disturbances of the rotor. An example of this latter use of pivoted weight-carrying arms is disclosed in the Sissingh et al. U.S. Pat. NO. 2,827,968, issued Mar. 25, 1958. In this patent, by pivoting the weight-carrying arms at the axis of rotation of the rotor, or as close thereto as is possible, and by connecting the linkage close to the pivoted ends of the arms (remote from the weights) the patentees are able to effect pitch changes of the blades to counteract external disturbances affecting the rotor and thus to stabilize the helicopter in flight.

SUMMARY OF THE INVENTION

It is a primary object of this invention to provide a system and a method of operating it for controlling vibratory forces in a helicopter rotor resulting from operation of the rotor in forward flight.

Another object of this invention is to provide such a system which reduces rotor vibratory forces by imparting higher harmonic blade pitch motions to the rotor blades.

A further object of this invention is to provide a vibration control system in which the blade and the control system can be tuned so that the undesirable vibratory forces of any one frequency are automatically sensed and the correct higher harmonic pitch motions necessary to eliminate these forces are automatically generated.

A yet further object of this invention is to provide such a system which is completely mechanical, resulting in a high degree of reliability.

A still further object of this invention is to provide such a vibration control system in which the vibration reducing forces are generated aerodynamically by the blades.

DESCRIPTION OF THE PREFERRED EMBODIMENT

Figure 1:
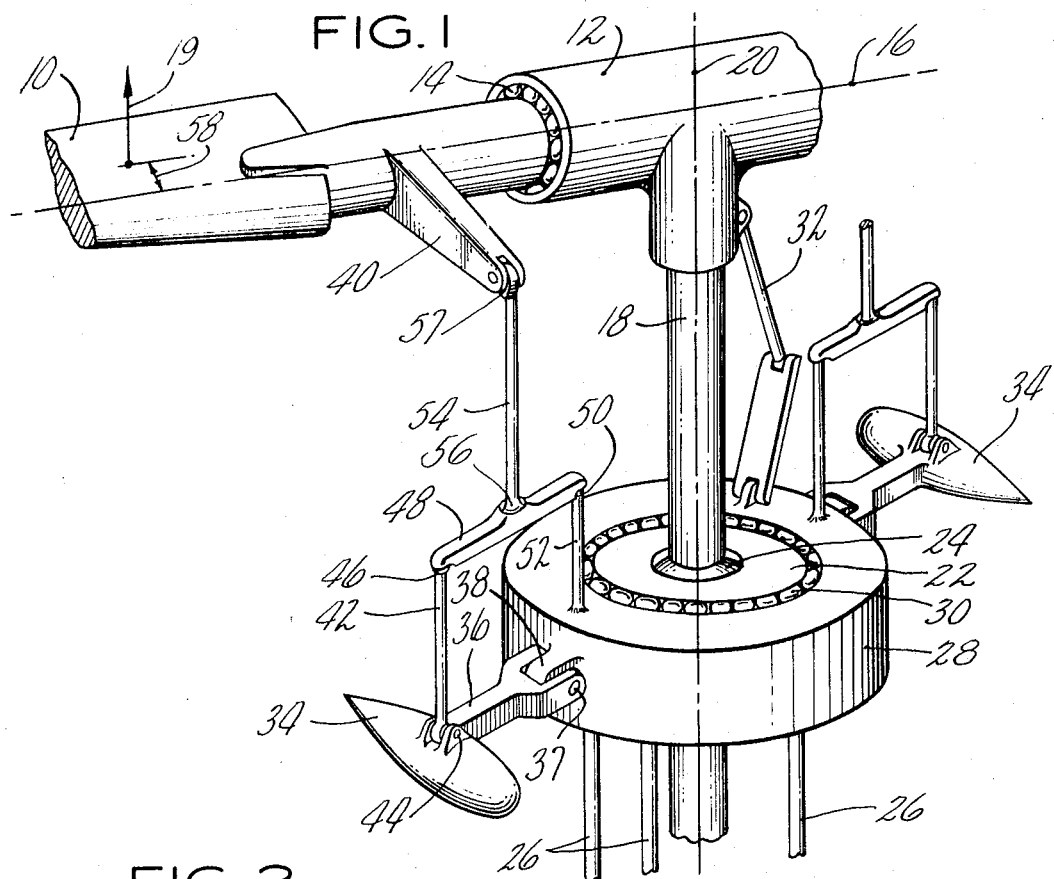
FIG. 1 is a schematic view of a helicopter rotor embodying my invention, parts being broken away to facilitate illustration.

My invention is illustrated in FIG. 1 as applied to a rotor having two blades, one of which is shown at 10, although the invention is equally applicable to rotors having more than two blades. The blades 10 are shown rigidly attached to a rotor hub 12 except for the bearings 14 which permit movement of each blade about its longitudinal axis 16 to change its pitch. However, my invention can be applied to articulated type rotor systems wherein the blades have flapping and/or lagging degrees of freedom.

Hub 12 is fixed to the upper end of a rotor shaft 18 which is supported for rotation about its generally vertical axis 20 in the usual manner. A nonrotating member 22 is so mounted on a spherical member 24 that it can be tilted to produce conventional cyclic pitch or translated along rotor shaft 18 to produce conventional collective pitch by appropriate actuation of three usual control rods 26 by the pilot. A member 28 is rotatably supported on member 22 by bearings 30 and is driven in rotation by a conventional scissors mechanism 32.

Weights 34 rigidly mounted on arms 36 are pivotally attached to member 28 on substantially horizontal hinge pins 37 which extend through the bifurcated inboard ends of the arms and through lugs 38 on the periphery of member 28. One of these pivoted arms, weighted at its outboard end, is provided for each blade of the rotor. Weights 34 are connected by linkage mechanism to blade horns 40 of their respective blades. To this end a generally vertical rod 42 is pivoted at 44 to each weight and has a universal ball-joint connection at 46 to a walking beam 48 which has a similar ball-joint connection 50 at its other end to the upper end of a generally vertical rod 52 rigidly mounted at its lower end on member 28. Another generally vertical rod 54 has a yoke at its lower end which straddles beam 48 and is pivotally connected thereto by a ball joint 56. Push rod 54 at its upper end is connected to blade horn 40 for universal pivotal movement by a ball-and-socket joint 57. By means of rods 42 and 52, crossbeam 48, push rod 54 and blade horn 40 vertical motions of rotating member 28 and/or weight 34 are transmitted and converted into blade pitch angle changes. Motion of member 28 produces conventional collective and first harmonic cyclic pitch while motion of member 34 produces higher than first harmonic pitch motions. It should be noted that blades 10 are positioned so that the resultant lift forces generated at 19 are displaced either fore or aft, herein aft, of the blade pitch changing axis by a distance 58. It should also be noted here that the horizontal hinge pin 37 for arms 36 are remote from rotor axis 20 and that push rod 42 is connected to the outer extremity of arm 36, or as shown, directly to weight 34 at the outboard end of the arm.

When a helicopter is operating in forward flight, significant vibratory forces in a direction generally aligned with the shaft 18 are generated which have a frequency of $n$/revolution, where $n$ is the number of blades. In addition to causing discomfort to the passengers, these forces also cause wear and tear on the aircraft. These vibratory forces are substantially eliminated by the control system above described when the system is tuned properly so that the vibratory forces of this one undesired frequency are sensed and the correct higher harmonic pitch motions necessary to eliminate these forces are generated.

The proper choice of the radial position of hinge pin 37 is important. It must be generally remote from the rotor axis 20 for multi-bladed rotors. Also the geometry of parts 48, 54 and 40 and the position of rod 54 on beam 48 as well as the location of hinge pin 37 must be properly chosen to tune the system so that the undesirable vibration is canceled. This is done by tuning the natural frequency of all the moving parts involved in the blade pitch motion to the frequency of the vibratory forces to be canceled. The pitching motion of the blade is then in resonance with the pitching moments exerted by the undesirable vibratory forces. The system will then respond to these exciting forces and will generate higher harmonic pitch motions at the frequency of excitation.

Figure 2:
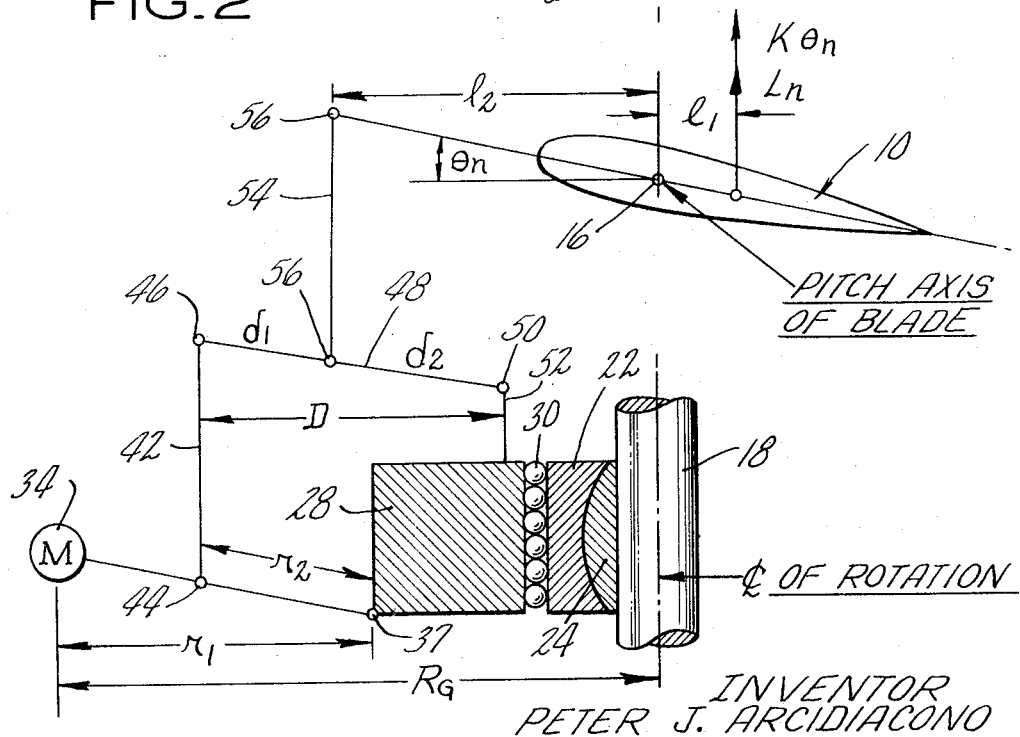
FIG. 2 is a line drawing showing the linkage system between a pivoted weight-carrying arm and its associated blade.

FIG. 2 shows a line diagram of the basic dynamic system under consideration and illustrates the procedure by which my vibration absorber is tuned. The equation of motion governing the response of this system to a harmonic lift force ($L_n$) acting on the blade is:

$$\theta_n \left\{ M\Omega^2 R_G r_1 \frac{l_2}{l_1} \frac{D}{d_1} - M r_1^2 (n\Omega)^2 \frac{l_2}{r_2} \frac{D}{d_1} + I_B \Omega^2 \frac{r_2}{l_2} \frac{d_1}{D} - I_B (n\Omega)^2 \frac{r^2}{l_2} \frac{d_1}{D} \right\} = -\frac{r_2}{l_2} \frac{d_1}{D} l_1 L_n - l_1 K \frac{r_2}{l_2} \frac{d_1}{D} \theta_n$$

, where $I_B$ = the blade pitching inertia
$\theta_n$ = the pitch angle of the blade
$\Omega$ = the rotational frequency of the rotor system
$n$ = the harmonic of rotor frequency to be canceled
$L_n$ = the harmonic lift force
$K$ = a constant
$M$ = the mass, and the dimensions are as shown in FIG. 2.

The forces acting on the blade are shown on the right side of the equation. The first is the vibratory force exciting the system; the second is the lift associated with the pitch response of the system ($\theta_n$). The equation shows that if the dynamic system is tuned so that the terms on the left side of the equation sum to zero, then the aerodynamic forces will also sum to zero. This means that the aerodynamic force produced by the blade response will be of such magnitude and phase as to exactly cancel the unwanted vibratory excitation. The tuning equation is thus:

$$M = -\frac{(1-n^2)}{\left(1-n^2\frac{r_1}{R_G}\right)} \frac{I_B}{l_2^3} \left(\frac{r_2}{r_1}\right)^2 \left(\frac{r_1}{R_G}\right) \left(\frac{d_1}{D}\right)^2$$

This particular form of the tuning equation is used as follows: (1) Establish the harmonic ($n$) of rotor frequency to be canceled, (2) Select the geometric lengths $r_1$, $R_G$, $l_2$, $r_2$, $d_1$, and $D$, (3) Determine the mass ($M$) required to tune the system for a given blade pitching inertia ($I_B$).

I claim:

1. In a helicopter rotor, a plurality of blades, each having a pitch changing horn, and means for reducing the vibrations set up in the rotating blades due to forward flight of the helicopter which consists of a tuned system comprising a plurality of weight-carrying arms pivoted to a rotating part of the rotor at points remote from the rotor axis and a linkage mechanism connecting said arms at their outer extremities with the blade horns of corresponding blades, said weights being located at the extremities of said arms.

2. In a helicopter rotor, a plurality of variable pitch blades rotatable about a common axis, each having a pitch changing horn, a vibratory control system rotatable about said rotor axis which is tuned to sense vibratory forces of the undesirable frequency set up in the rotor due to its forward movement in flight and to generate the correct harmonic pitch motions and associated aerodynamic forces necessary to eliminate said forces of undesirable frequency, said system including a plurality of weight-carrying arms, one for each blade, pivoted at one of their ends to a rotating part of the rotor at points remote from the rotor axis, the weights being located adjacent the other ends of said arms, and linkage mechanism connecting said arms at their outer extremities with the blade horns of corresponding blades.

3. In a helicopter rotor, a plurality of variable pitch blades, each having a pitch changing horn, and means for eliminating the undesirable vibrations set up in the rotating blades due to forward flight of the helicopter which consists of a vibrating system which can be tuned to generate harmonic blade pitch motions and associated aerodynamic forces in the rotor blades to counteract these undesirable vibrations, said system comprising a plurality of weight-carrying arms pivoted at one of their ends to a rotating part of the rotor at points remote from the rotor axis, the weights being located adjacent the other extremities of said arms, and linkage mechanism connecting said arms at their outer extremities with the blade horns of corresponding blades.

4. A vibration control system for helicopter rotors of the type including a plurality of variable pitch blades, each having a pitch changing horn, in which the rotor blades and the control system can be tuned so that the undesirable vibratory forces of any one frequency are automatically sensed and the correct harmonic pitch motions and associated aerodynamic forces necessary to eliminate these undesirable forces are automatically generated, said system comprising a plurality of weight-carrying arms pivoted at one of their ends to a rotating part of the rotor at points remote from the rotor axis, the weights being located adjacent the other ends of said arms, and linkage mechanism connecting said arms at their outer extremities with the pitch changing horns of corresponding blades.

* * * * *